(12) United States Patent
Sun et al.

(10) Patent No.: US 11,977,567 B2
(45) Date of Patent: May 7, 2024

(54) METHOD OF RETRIEVING QUERY, ELECTRONIC DEVICE AND MEDIUM

(71) Applicant: Beijing Baidu Netcom Science Technology Co., Ltd., Beijing (CN)

(72) Inventors: Yuqing Sun, Beijing (CN); Shichen Shao, Beijing (CN); Yongheng Li, Beijing (CN); Renhua Zou, Beijing (CN); Fei Xu, Beijing (CN); Chengzhi Fang, Beijing (CN); Gang Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 71 days.

(21) Appl. No.: 17/837,347

(22) Filed: Jun. 10, 2022

(65) Prior Publication Data
US 2022/0300543 A1 Sep. 22, 2022

(30) Foreign Application Priority Data
Jun. 15, 2021 (CN) .......................... 202110663448.1

(51) Int. Cl.
*G06F 16/00* (2019.01)
*G06F 16/31* (2019.01)
(Continued)

(52) U.S. Cl.
CPC ........ *G06F 16/3329* (2019.01); *G06F 16/319* (2019.01); *G06F 16/38* (2019.01); *G06F 40/30* (2020.01)

(58) Field of Classification Search
CPC .... G06F 16/3329; G06F 16/319; G06F 16/38; G06F 40/30; G06F 16/90332; G06F 40/289; G06F 16/9532
See application file for complete search history.

(56) References Cited

U.S. PATENT DOCUMENTS 9,122,727 B1 * 9/2015 Liu .................. G06F 16/248
2003/0126136 A1 * 7/2003 Omoigui ............... H04L 67/02
(Continued)

FOREIGN PATENT DOCUMENTS

CN 109033244 A 12/2018
CN 110750616 A 2/2020
(Continued)

*Primary Examiner* — Jared M Bibbee
(74) *Attorney, Agent, or Firm* — Keating & Bennett, LLP

(57) ABSTRACT

A method of retrieving a query, an electronic device, and a medium are provided, which relate to fields of intelligent searching, intelligent recommendation, natural language processing, etc. The method of retrieving a query includes: processing a query to be retrieved, so as to obtain a first processing result for the query to be retrieved, the first processing result containing a first text information and a first semantic information; comparing the first processing result with a second processing result of each of at least one candidate query, so as to obtain a comparison result, the second processing result containing a second text information and a second semantic information; determining a target query from the at least one candidate query based on the comparison result; and determining at least one of the target query or an answer corresponding to the target query as a retrieving result.

13 Claims, 5 Drawing Sheets

(51) Int. Cl.
*G06F 16/332* (2019.01)
*G06F 16/38* (2019.01)
*G06F 40/30* (2020.01)

(56) References Cited

U.S. PATENT DOCUMENTS

| | | | |
|---|---|---|---|
| 2012/0078888 A1* | 3/2012 | Brown | G06F 16/284 |
| | | | 707/723 |
| 2012/0330962 A1* | 12/2012 | Huang | G06F 16/3322 |
| | | | 707/E17.046 |
| 2015/0142418 A1* | 5/2015 | Byron | G06F 40/40 |
| | | | 704/9 |
| 2016/0103833 A1* | 4/2016 | Sanders | G06F 16/9535 |
| | | | 707/723 |
| 2016/0275148 A1* | 9/2016 | Jiang | G06F 16/24522 |
| 2018/0011927 A1* | 1/2018 | Lee | G06F 16/3329 |
| 2019/0095537 A1* | 3/2019 | Zhong | G06F 16/9535 |
| 2019/0392066 A1* | 12/2019 | Kim | G06F 16/24578 |
| 2022/0253477 A1* | 8/2022 | Lipka | G06N 20/00 |

FOREIGN PATENT DOCUMENTS

| | | |
|---|---|---|
| CN | 111382255 A | 7/2020 |
| CN | 112948553 A | 6/2021 |

\* cited by examiner

METHOD OF RETRIEVING QUERY, ELECTRONIC DEVICE AND MEDIUM

CROSS REFERENCE TO RELATED APPLICATION(S)

This application claims priority to Chinese Patent Application No. 202110663448.1, filed on Jun. 15, 2021, the entire content of which is incorporated herein in its entirety by reference.

TECHNICAL FIELD

The present disclosure relates to a field of computer technology, in particular to fields of intelligent searching, intelligent recommendation, natural language processing, etc., and more specifically, to a method of retrieving a query, an electronic device, and a medium.

BACKGROUND

When a query is searched by a user through a network, in related art, a matching process is usually performed from a query bank based on the query to be retrieved entered by the user, and a matched query is feedback to the user as a retrieving result. However, in the related art of the query retrieving, a retrieving efficiency is low, a retrieving accuracy is low, and the retrieving result is difficult to meet user desires.

SUMMARY

A method of retrieving a query, an electronic device, and a storage medium are provided.

According to an aspect of the present disclosure, a method of retrieving a query is provided, and the method includes: processing a query to be retrieved, so as to obtain a first processing result for the query to be retrieved, the first processing result containing a first text information and a first semantic information; comparing the first processing result with a second processing result of each of at least one candidate query, so as to obtain a comparison result, the second processing result containing a second text information and a second semantic information; determining a target query from the at least one candidate query based on the comparison result; and determining at least one of the target query or an answer corresponding to the target query as a retrieving result.

According to another aspect of the present disclosure, an electronic device is provided, and the electronic device includes: at least one processor; and a memory communicatively connected to the at least one processor. The memory stores instructions executable by the at least one processor, and the instructions, when executed by the at least one processor, cause the at least one processor to implement the method of retrieving a query described above.

According to another aspect of the present disclosure, a non-transitory computer-readable storage medium having computer instructions stored thereon is provided, the computer instructions are configured to cause a computer to implement the method of retrieving a query described above.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to better understand the scheme and do not constitute a limitation of the present disclosure, in which.

DETAILED DESCRIPTION OF EMBODIMENTS

Figure 1:
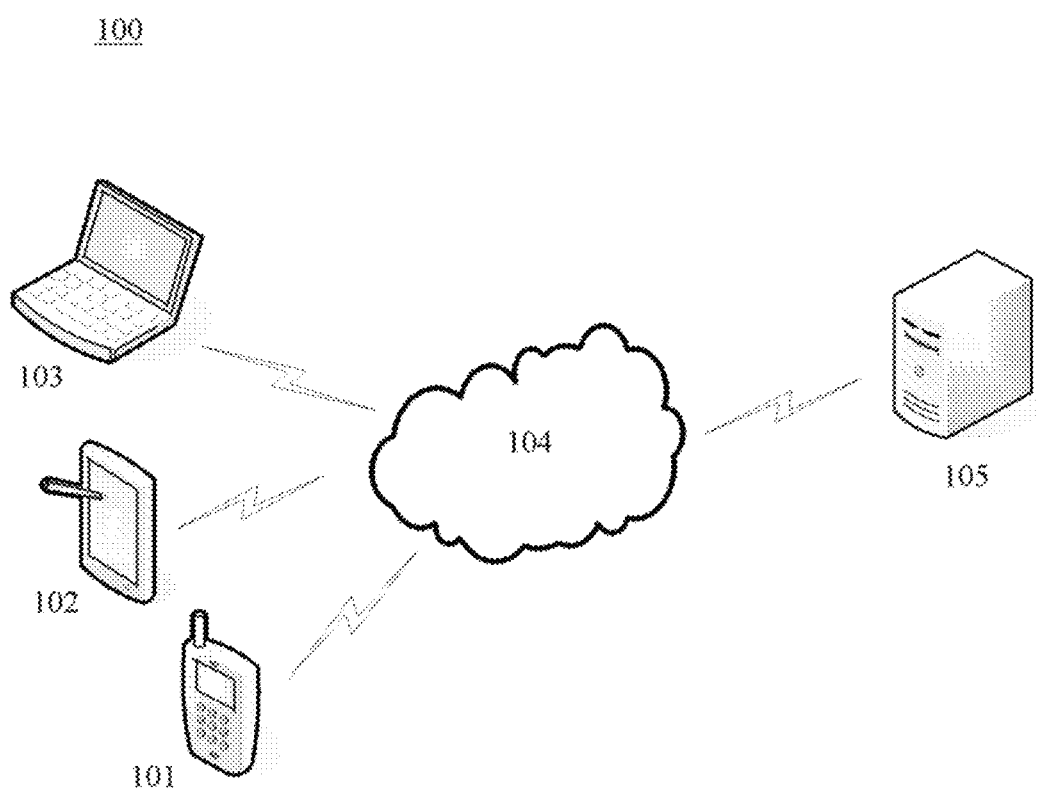
FIG. 1 schematically shows a system architecture of a method and an apparatus of retrieving a query according to the embodiments of the present disclosure.

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

The terms used herein are only for the purpose of describing specific embodiments and are not intended to limit the present disclosure. The terms "include", "comprise", etc. used herein indicate existence of the features, steps, operations and/or components, but do not exclude the existence or addition of one or more other features, steps, operations or components.

All terms (including a technical term and a scientific term) used herein have meanings generally understood by those skilled in the art, unless otherwise defined. It should be noted that the terms used herein should be interpreted as having a meaning consistent with the context of this specification and should not be interpreted in an idealized or overly rigid manner.

In a case of using an expression similar to "at least one of A, B or C, etc.", it should be explained generally according to the meaning of the expression generally understood by those skilled in the art (for example, "a system having at least one of A, B or C" shall include but not limited to a system having A alone, having B alone, having C alone, having A and B, having A and C, having B and C, and/or having A, B, and C, etc.).

The query retrieving of the embodiments of the present disclosure includes, for example, question retrieving. A question that does not have an answer known by a user is entered by the user, and a question and an answer matched with and corresponding to the question may be obtained by retrieving.

Term segmentation technology and text matching technology may be used to retrieve the query. If the query to be retrieved has many characters, a large number of terms may be obtained after the term segmentation. Retrieving based on the large number of terms is difficult to accurately determine a retrieving intention. For example, when the query to be retrieved is "for ## industry, the current situation and policy are", the term segmentation is performed on the query to obtain a plurality of terms. As many queries related to "policy" exist in a query bank, a retrieving result may have no relationship with "## industry".

It is difficult to achieve the understanding of the user's searching intention through the term segmentation technology and text matching technology. For example, an answer to a query may not overlap with the query in terms of text, which causes it difficult to meet a retrieving requirement by text matching after the term segmentation. For example, when a query to be retrieved is "a characteristic of ## regional culture is ( )", an expected retrieving result may be an answer such as "broad and profound", but a retrieving result obtained through text matching are usually highly relevant to terms such as "## regional culture" and "characteristic".

When retrieving through the term segmentation technology and the text matching technology, a meaningless information may exist in the query to be retrieved. In a process of retrieval, the meaningless information is usually calculated with the same weight as a valid information, resulting in a retrieving result failing to meet the retrieving requirement. For example, when a query to be retrieved is "in ######, which of the following options is correct?" the second half of the text "which of the following options is correct?" is a general description of a multiple-choice query. When calculating a similarity, the retrieving result may be inaccurate if the general description has the same weight as other contents.

When retrieving through the term segmentation technology and text matching technology, similar queries usually have multiple expressions, resulting in inconsistent retrieving results for similar queries. For example, a query to be retrieved "which of the following options are correct on condition that ###?", a query to be retrieved "which of the following options are wrong on condition that ###?", and a query to be retrieved "_____ is correct on condition that ###." are similar queries, the retrieving results obtained through the term segmentation technology and text matching technology may be quite different from each other.

When retrieving through the term segmentation technology and text matching technology, if the query to be retrieved has too many words, it will lead to a slow retrieving speed and a poor retrieving stability.

In view of this, a method of retrieving a query is provided according to the embodiments of the present disclosure. The method of retrieving a query includes: processing a query to be retrieved, so as to obtain a first processing result for the query to be retrieved, the first processing result containing a first text information and a first semantic information; comparing the first processing result with a second processing result of each of at least one candidate query, so as to obtain a comparison result, the second processing result containing a second text information and a second semantic information; determining a target query from the at least one candidate query based on the comparison result; and determining at least one of the target query or an answer corresponding to the target query as a retrieving result.

FIG. 1 schematically shows a system architecture of a method and an apparatus of retrieving a query according to the embodiments of the present disclosure. It should be noted that FIG. 1 is only an example of the system architecture to which the embodiments of the present disclosure may be applied to help those skilled in the art understand the technical content of the present disclosure, but it does not mean that the embodiments of the present disclosure may not be used in other devices, systems, environments or scenes.

As shown in FIG. 1, the system architecture 100 according to the embodiments may include clients 101, 102, 103, a network 104, and a server 105. The network 104 is a medium for providing a communication link between the clients 101, 102, 103 and the server 105. The network 104 may include various connection types, such as wired communication links, wireless communication links, optical fiber cables, and the like.

The clients 101, 102, 103 may be used by a user to interact with the server 105 through the network 104 to receive or transmit messages, etc. Various communication client applications may be installed on the clients 101, 102 and 103, such as shopping applications, web browser applications, searching applications, instant messaging tools, mailbox clients, social platform software, etc. (only examples).

The clients 101, 102, 103 may be various electronic devices that have a display screen and support web browsing, including but not limited to smart phones, tablets, laptops, desktops, etc. The clients 101, 102, 103 of the embodiments of the present disclosure may run an application, for example.

The server 105 may be a server that provides various services, such as a background management server that supports the website browsed by the user using the clients 101, 102 and 103 (only an example). The background management server may analyze and process a received user request and other data, and feedback a processing result (such as a web page, information, or data acquired or generated according to the user request) to the client. In addition, the server 105 may also be a cloud server, that is, the server 105 has a cloud computing function.

It should be noted that the method of retrieving a query provided by the embodiments of the present disclosure may be performed by the server 105. Accordingly, the apparatus of retrieving a query provided by the embodiments of the present disclosure may be provided in the server 105. The method of retrieving a query provided by the embodiments of the present disclosure may also be performed by a server or server cluster which is different from the server 105 and capable of communicating with the clients 101, 102, 103 and/or the server 105. Accordingly, the apparatus of retrieving a query provided by the embodiments of the present disclosure may also be provided in the server or server cluster which is different from the server 105 and capable of communicating with the clients 101, 102, 103 and/or the server 105.

For example, a query to be retrieved may be sent by a user through the clients 101, 102 and 103. After the server 105 receives the query to be retrieved from the clients 101, 102 and 103 through the network 104, the server 105 may retrieve based on the query to be retrieved to obtain a retrieving result, and then the server 105 transmits the retrieving result to the clients 101, 102 and 103 through the network 104, so as to recommend the retrieving result to the user.

It should be understood that the number of clients, network and server shown in FIG. 1 is only schematic. There may be any number of clients, networks and servers according to implementation desires.

A method of retrieving a query is provided according to the embodiments of the present disclosure. The method of retrieving a query according to the exemplary embodiments of the present disclosure is described below with reference to FIGS. 2 to 5 in combination with the system architecture of FIG. 1. The method of retrieving a query of the embodiments of the present disclosure may be performed by the server 105 shown in FIG. 1, for example.

Figure 2:
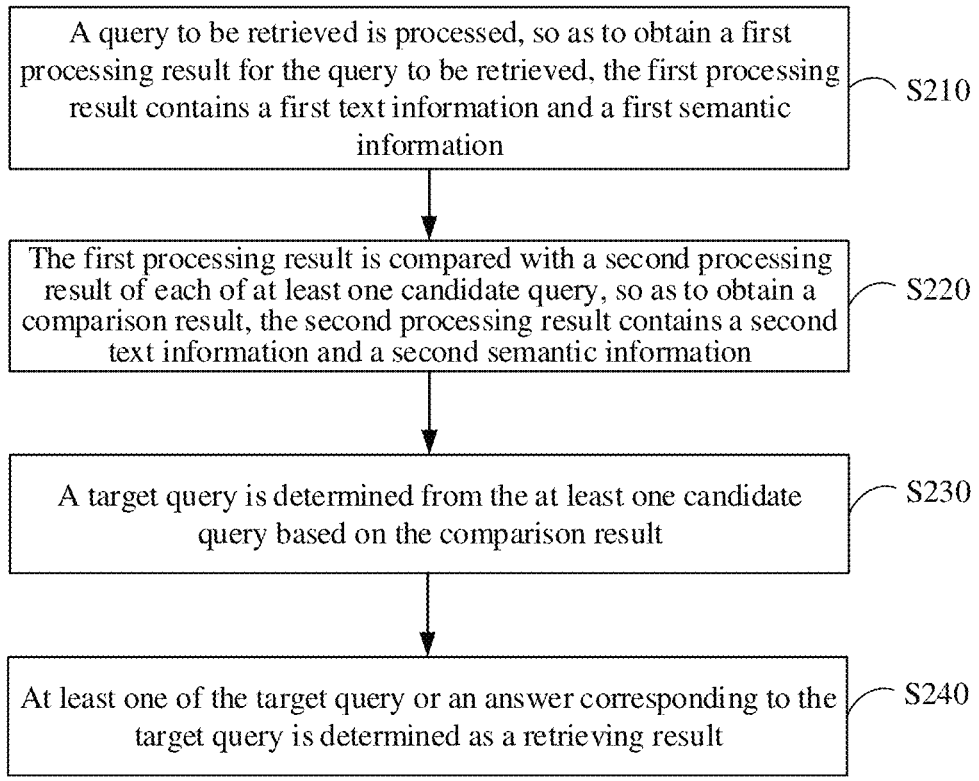
FIG. 2 schematically shows a flowchart of a method of retrieving a query according to the embodiments of the present disclosure.

FIG. 2 schematically shows a flowchart of a method of retrieving a query according to the embodiments of the present disclosure.

As shown in FIG. 2, the method 200 of retrieving a query of the embodiments of the present disclosure may include, for example, operations S210 to S240.

In operation S210, a query to be retrieved is processed, so as to obtain a first processing result for the query to be retrieved, and the first processing result contains a first text information and a first semantic information.

In operation S220, the first processing result is compared with a second processing result of each of at least one candidate query, so as to obtain a comparison result, and the second processing result contains a second text information and a second semantic information.

In operation S230, a target query is determined from the at least one candidate query based on the comparison result.

In operation S240, at least one of the target query or an answer corresponding to the target query is determined as a retrieving result.

For example, a natural speech processing technology is used to process the query to be retrieved to obtain the first processing result. For example, the term segmentation technology is used to segment the query to be retrieved, so as to obtain the first text information. The first text information includes, for example, a plurality of terms. A semantic understanding technology is used to understand the query to be retrieved semantically, so as to obtain the first semantic information for the query to be retrieved. The term may be a Chinese character, an expression, or an English word.

For example, at least one candidate query is stored in a query bank, and each candidate query may be processed using the natural speech processing technology to obtain the second processing result. For example, the term segmentation technology is used to segment the candidate query to obtain the second text information. The second text information includes, for example, a plurality of terms. The semantic understanding technology is used to understand the candidate query semantically, so as to obtain the second semantic information for the candidate query.

Next, the first processing result and the second processing result are compared to obtain the comparison result. The comparison result represents a similarity between the query to be retrieved and each candidate query. Then, a candidate query with a high similarity to the query to be retrieved is selected from the at least one candidate query as a target query based on the comparison result. After determining the target query, if the target query has a corresponding answer, at least one of the target query or the corresponding answer may be determined as the retrieving result, and the retrieving result may be recommended. For example, the target query may be determined as the retrieving result, or the answer may be determined as the retrieving result, or both the target query and the answer may be determined as the retrieving result.

According to the embodiments of the present disclosure, the query matching is performed based on the text information and the semantic information of the query, which improves a recall rate of the target query. For example, when it is difficult to recall a query with low text similarity but high semantic similarity through text information matching, the recall of the query is supplemented by the semantic information, which improves the recall rate of the query, so that the accuracy of the recalled query is higher and the recalled query meets the retrieving requirements.

For example, the comparison result includes a first comparison sub-result. The first comparison sub-result is obtained, for example, based on the first text information and the second text information. For example, the first text information is compared with the second text information to obtain a similarity between the first text information and the second text information, and the similarity is determined as the first comparison sub-result. When the more the terms in the first text information are similar to those in the second text information, the query to be retrieved is more similar to the target query. For example, the similarity of the terms may be calculated by TF/IDF similarity algorithm.

For example, the comparison result also includes a second comparison sub-result. The second comparison sub-result is obtained, for example, based on the first semantic information and the second semantic information. For example, the first semantic information is compared with the second semantic information to obtain a similarity between the first semantic information and the second semantic information, and the similarity is determined as the second comparison sub-result. When a vector distance between a vector representing the first semantic information and a vector representing the second semantic information is smaller, the query to be retrieved is more similar to the target query.

Next, a first candidate query is determined from the at least one candidate query based on the first comparison sub-result, and a second candidate query is determined from the at least one candidate query based on the second comparison sub-result. Then, an intersection of the first candidate query and the second candidate query is determined as the target query, so that the target query and the corresponding answer are determined as the retrieving result.

In another example, the at least one candidate query stored in the query bank is divided into a plurality of groups, for example, according to a query type. The query type includes but is not limited to a single-choice query, a multiple-choice query, a judgment query, a blank-filling query, a noun-explanation query, a calculation query, and a discussion query. When matching the target query based on the query to be retrieved, a target group may be determined from the plurality of groups based on the query type of the query to be retrieved, and a query type of a candidate query in the target group is matched with a query type of the query to be retrieved. Then, the first processing result of the query to be retrieved is compared with the second processing result of the candidate query in the target group, so as to determine the target query from the target group. In addition to determining the target query from the target group, the target query may also be determined from other groups according to actual cases.

In the embodiments of the present disclosure, the candidate queries in the query bank are divided into a plurality of groups based on the query type. When retrieving the query, it is possible to retrieve in a corresponding group according to the query type of the query to be retrieved, which improves a pertinence and efficiency of the retrieving, and makes the retrieving result more in line with the retrieving requirements.

According to the embodiments of the present disclosure, sorting may be performed on the retrieving result after the retrieving result is obtained, so as to recommend a sorted retrieving result. The sorting process of the embodiments of the present disclosure may be described below with reference to FIGS. 3 to 4.

Figure 3:
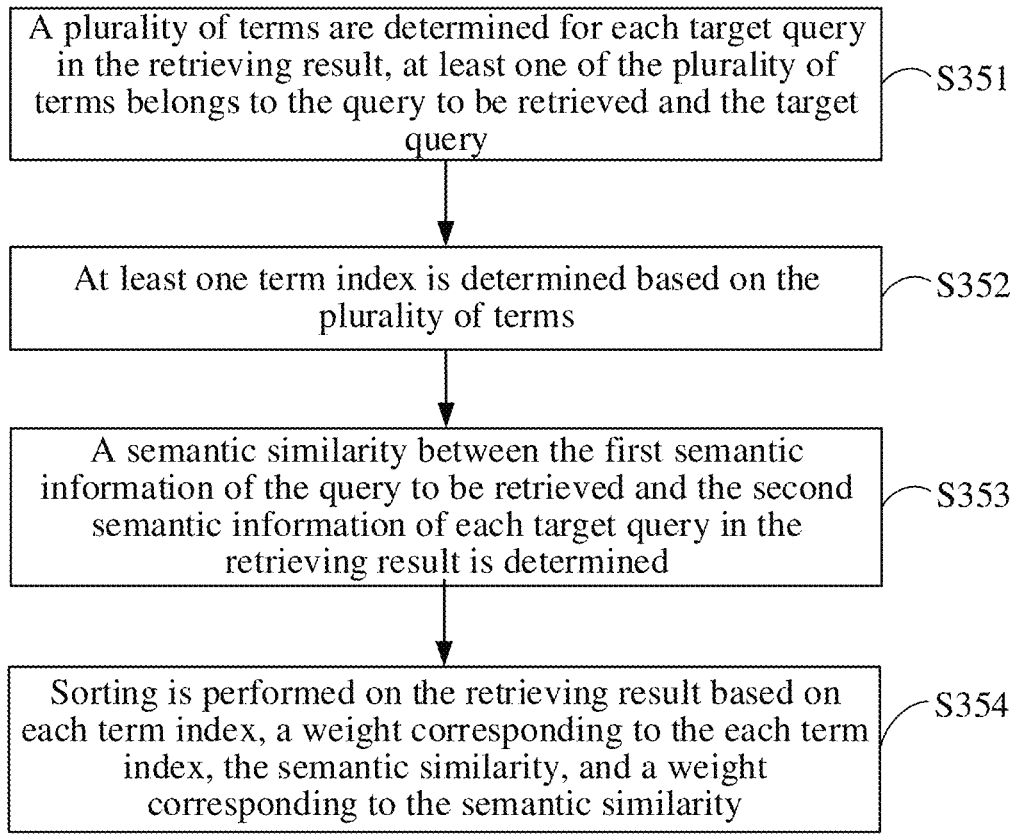
FIG. 3 schematically shows a flowchart of a sorting process according to the embodiments of the present disclosure.

FIG. 3 schematically shows a flowchart of a sorting process according to the embodiments of the present disclosure.

As shown in FIG. 3, the sorting process of the embodiments of the present disclosure may include, for example, operations S351 to S354.

In operation S351, a plurality of terms are determined for each target query in the retrieving result, at least one of the plurality of terms belongs to the query to be retrieved and the target query.

For example, the determined terms belong to both the query to be retrieved and the target query. For example, the plurality of terms may belong to the first text information and the second text information.

In operation S352, at least one term index is determined based on the plurality of terms.

The at least one term index includes, for example, a position similarity, a first proportion, and a second proportion. The determination of each term index will be described below.

For the position similarity, a position similarity between a first position information of the plurality of terms in the query to be retrieved and a second position information of the plurality of terms in the target query is determined based on the first position information and the second position information. The more similar the first position information and the second position information are, the higher the position similarity is.

For example, the position similarity is used to represent an order and an arrangement compactness of the plurality of terms in the query to be retrieved and the target query. The more similar the order of the plurality of terms in the query to be retrieved and the order of the plurality of terms in the target query, the higher the position similarity. The closer the arrangement compactness of the plurality of terms in the query to be retrieved and the arrangement compactness of the plurality of terms in the target query, the higher the position similarity.

For example, the query to be retrieved is "ABCD", in which A, B, C and D represent four terms. A first target query is, for example, "ABCcD", and a second target query is, for example, "CABcD". Then, the order of terms in the query to be retrieved is more similar to that in the first target query.

For example, the query to be retrieved is "ABCD", the first target query is, for example, "ABCcD", and the second target query is, for example, "AaBbCcDd". Then, the arrangement compactness of the terms in the query to be retrieved is closer to that in the first target query.

For the first proportion, a first proportion of the plurality of terms in the query to be retrieved is determined. For example, a ratio of a number of the plurality of terms to a total number of terms in the query to be retrieved is determined as the first proportion. The total number of terms in the query to be retrieved may be determined from the first text information.

For the second proportion, a second proportion of the plurality of terms in the target query is determined. For example, a ratio of a number of the plurality of terms to a total number of terms in the target query is determined as the second proportion. The total number of terms in the target query may be determined from the second text information.

In operation S353, a semantic similarity between the first semantic information of the query to be retrieved and the second semantic information of each target query in the retrieving result is determined.

For example, the first semantic information is represented as a first vector, and the second semantic information is represented as a second vector. The smaller a vector distance between the first vector and the second vector, the more similar the query to be retrieved is to the target query.

In operation S354, sorting is performed on the retrieving result based on each term index, a weight corresponding to the each term index, the semantic similarity, and a weight corresponding to the semantic similarity.

For example, a score of each target query is calculated and the sorting is performed based on the score of each target query.

Taking a target query as an example, in the at least one term index, the position similarity is expressed as offset, the weight corresponding to the position similarity is expressed as $w_1$, the first proportion is expressed as cqr, the weight corresponding to the first proportion is expressed as $w_2$, the second proportion is expressed as ctr, the weight corresponding to the second proportion is expressed as $w_3$, the semantic similarity is expressed as NNscore, and the weight corresponding to the semantic similarity is expressed as $w_4$. The score of the target query is textrel_score=$w_1$*offset+ $w_2$*cqr+$w_3$*ctr+$w_4$*NNscore.

In the embodiments of the present disclosure, the score for each target query is obtained by a weighted calculation according to multiple indexes for the text and the semantic similarity, and the target queries in the retrieving result are sorted based on the determined scores. Then, the recommendation of the target query is performed according to the sorting result, so as to improve the accuracy of the recommendation and make the recommended retrieving result more in line with the retrieving requirements. The required target query may quickly found by the user according to the sorting result.

Figure 4:
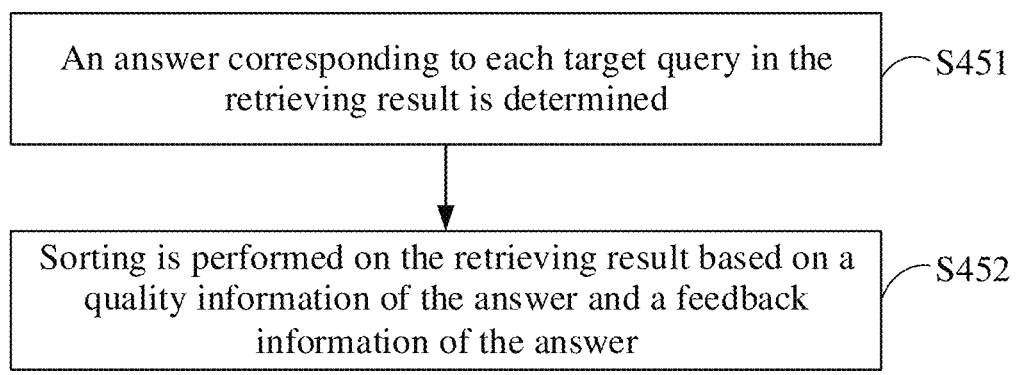
FIG. 4 schematically shows a flowchart of a sorting process according to the embodiments of the present disclosure.

FIG. 4 schematically shows a flowchart of a sorting process according to the embodiments of the present disclosure.

As shown in FIG. 4, the sorting process of the embodiments of the present disclosure may include, for example, operations S451 to S452.

In operation S451, an answer corresponding to each target query in the retrieving result is determined.

In operation S452, sorting is performed on the retrieving result based on a quality information of the answer and a feedback information of the answer.

For example, the quality information includes: whether the answer is missing or not or whether a format of the answer is a picture format or not, and so on. When the answer is missing or the format of the answer is a picture format, the quality of the answer is low. When sorting the plurality of target queries, a target query and its corresponding answer with a low quality may be ranked at the bottom.

For example, the feedback information includes: an evaluation information of a user on the answer or a behavior information of a user on the answer, and so on. When the user has a high evaluation on the answer, or the user has a copying behavior on the answer or reading the answer for a long time, the answer is more in line with the user's desires.

When sorting the plurality of target queries, a target query and its corresponding answer that meet user desires may be ranked at the top.

In the embodiments of the present disclosure, the target queries are sorted according to the quality information and the feedback information of the answers, so that the accuracy of the recommendation is improved, and the recommended retrieving result is more in line with the user desires. The required target query may be quickly found by the user according to the sorting result.

In the embodiments of the present disclosure, the sorting may be performed based on both the score of each target query and the quality information of the answer and the feedback information of the answer. Alternatively, the sorting may be performed based on the score of each target query, and then further sorting may be performed based on the quality information of the answer and the feedback information of the answer. Alternatively, the sorting may be performed based on the quality information of the answer and the feedback information of the answer, and then further sorting may be performed based on the score of each target query.

Figure 5:
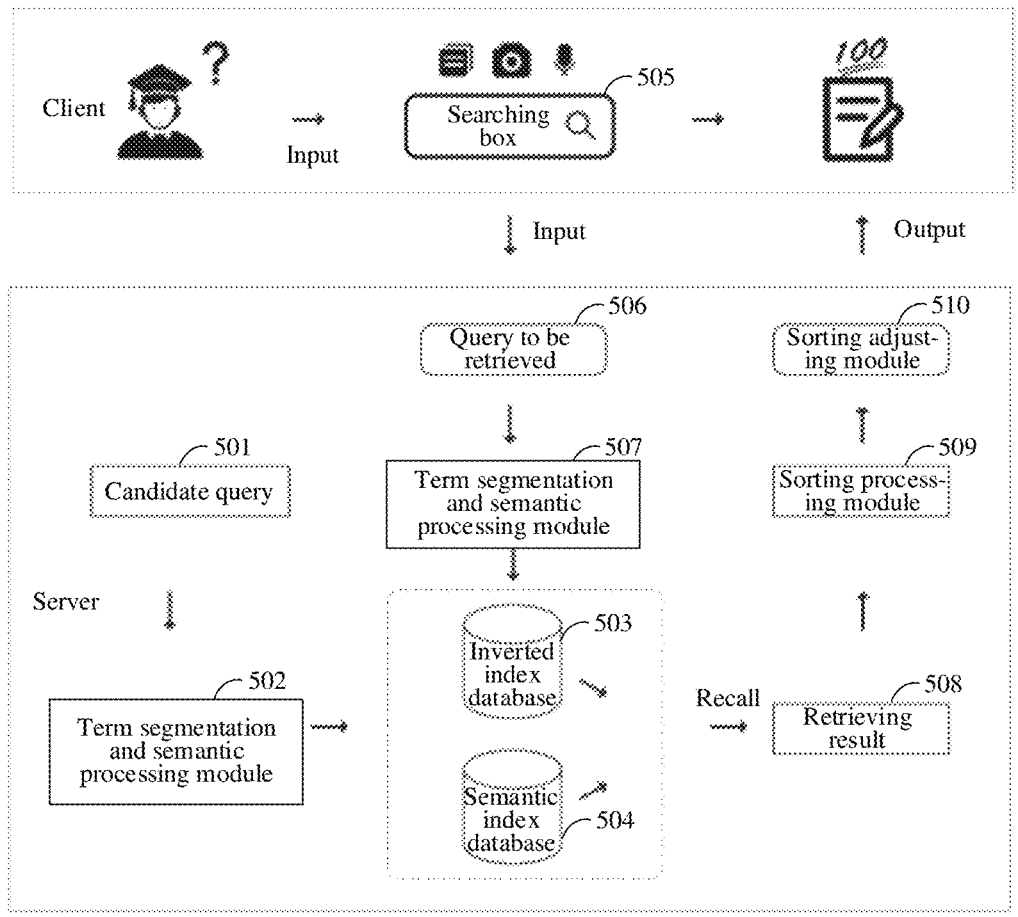
FIG. 5 schematically shows a schematic diagram of retrieving a query according to the embodiments of the present disclosure.

FIG. 5 schematically shows a schematic diagram of retrieving a query according to the embodiments of the present disclosure.

As shown in FIG. 5, on a server side, each of a plurality of candidate queries 501 in a query bank is processed by a term segmentation and semantic processing module 502, so as to obtain a term segmentation result and a semantic understanding result for each candidate query. An inverted index database 503 is constructed based on the term segmentation result, and a semantic index database 504 is constructed based on the semantic understanding result. Constructing the inverted index database 503 refers to establishing a mapping relationship between different terms and the query after the query is segmented into the plurality of terms. In this way, all queries containing a term may be acquired during indexing according to the term and the mapping relationship.

When a query entered by a user in a searching box 505 is received by a client, the entered query is transmitted to the server as a query to be retrieved 506.

After the query to be retrieved 506 from the client is received by the server, the query to be retrieved 506 is processed by using a term segmentation and semantic processing module 507, so as to obtain a term segmentation result and a semantic understanding result for the query to be retrieved 506. Then, the query retrieving is performed in the inverted index database 503 based on the term segmentation result, and the query retrieving is performed in the semantic index database 504 based on the semantic understanding result. A target query recalled from the inverted index database 503 and the semantic index database 504 is determined as a retrieving result 508.

The term segmentation and semantic processing module 502 and the term segmentation and semantic processing module 507 may be the same module, that is, the same term segmentation strategy and semantic understanding strategy are used to process the query to be retrieved 506 and the candidate query 501, so as to improve the accuracy of retrieving. However, it is not excluded that the term segmentation and semantic processing module 502 and the term segmentation and semantic processing module 507 may be different modules. Whether for the query to be retrieved 506 or the candidate query 501, further processing may be performed after the plurality of terms are obtained by the term segmentation process.

The further processing includes noise removing, query truncating, duplication removing, normalization, specific words removing, and so on. For example, the noise removing includes removing garbled codes and meaningless symbols from the plurality of terms. The query truncating includes truncating the plurality of terms to obtain terms for different sub-queries, or truncating the plurality of terms to obtain terms belonging to different options. Especially when the user searches by taking photos, the query in the photo usually include a plurality of sub-queries or a plurality of options. The duplication removing includes, for example, removing duplicate terms. The normalization includes, for example, unifying a format of the terms. The specific words removing includes removing function words, prepositions, adverbs and symbols in the terms to avoid interference and improve retrieving efficiency.

After obtaining the retrieving result 508, a plurality of target queries in the retrieving result 508 are sorted by using a sorting processing module 509. The sorting processing is described above, which will not be repeated here.

After the sorting result is obtained by sorting the plurality of target queries in the retrieving result 508 using the sorting processing module 509, further sorting may be performed by using a sorting adjusting module 510. The sorting adjusting module 510 may adjust the sorting result output by the sorting processing module 509 online according to actual desires, and output the adjusted result to the client.

Through the method of retrieving a query of the embodiments of the present disclosure, the recall rate of the query may be increased to more than 96% and the accuracy rate may be increased to more than 77%. The recall rate refers to a proportion of the queries that may be recalled after photographing, voice and simulating user input for existing queries in the query bank. The accuracy rate refers to a ratio of correct target queries to all target queries in the retrieving result. The correct target query indicates that the answer of the target query may be used to answer the query to be retrieved. In terms of retrieving performance, the retrieving time period may be reduced to less than 187 ms, and the stability may reach 99.99%.

Figure 6:
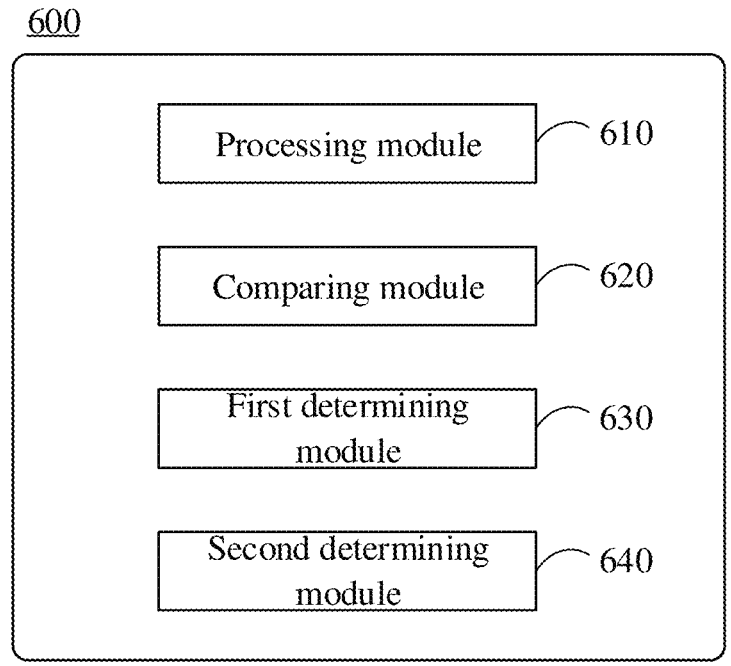
FIG. 6 schematically shows a block diagram of an apparatus of retrieving a query according to the embodiments of the present disclosure.

FIG. 6 schematically shows a block diagram of an apparatus of retrieving a query according to the embodiments of the present disclosure.

As shown in FIG. 6, the apparatus 600 of retrieving a query of the embodiments of the present disclosure includes, for example, a processing module 610, a comparing module 620, a first determining module 630, and a second determining module 640.

The processing module 610 may be used to process a query to be retrieved, so as to obtain a first processing result for the query to be retrieved, wherein the first processing result contains a first text information and a first semantic information. According to the embodiments of the present disclosure, the processing module 610 may, for example, perform the operation S210 described above with reference to FIG. 2, which will not be repeated here.

The comparing module 620 may be used to compare the first processing result with a second processing result of each of at least one candidate query, so as to obtain a comparison result, wherein the second processing result contains a second text information and a second semantic information. According to the embodiments of the present disclosure, the comparing module 620 may, for example, perform the operation S220 described above with reference to FIG. 2, which will not be repeated here.

The first determining module 630 may be used to determine a target query from the at least one candidate query based on the comparison result. According to the embodiments of the present disclosure, the first determining module 630 may, for example, perform the operation S230 described above with reference to FIG. 2, which will not be repeated here.

The second determining module 640 may be used to determine at least one of the target query or an answer corresponding to the target query as a retrieving result. According to the embodiments of the present disclosure, the second determining module 640 may, for example, perform the operation S240 described above with reference to FIG. 2, which will not be repeated here.

According to the embodiments of the present disclosure, the comparison result includes a first comparison sub-result and a second comparison sub-result, the first comparison sub-result is obtained based on the first text information and the second text information, and the second comparison sub-result is obtained based on the first semantic information and the second semantic information. The first determining module 630 includes: a first determining sub-module, a second determining sub-module, and a third determining sub-module. The first determining sub-module is used to determine a first candidate query from the at least one candidate query based on the first comparison sub-result. The second determining sub-module is used to determine a second candidate query from the at least one candidate query based on the second comparison sub-result. The third determining sub-module is used to determine an intersection of the first candidate query and the second candidate query as the target query.

According to the embodiments of the present disclosure, the apparatus 600 may further include a first sorting module, used to perform sorting on the retrieving result to recommend a sorted retrieving result. The first sorting module includes: a fourth determining sub-module, a fifth determining sub-module, a sixth determining sub-module, and a first sorting sub-module. The fourth determining sub-module is used to determine a plurality of terms for each target query in the retrieving result, wherein at least one of the plurality of terms belongs to the query to be retrieved and the target query. The fifth determining sub-module is used to determine at least one term index based on the plurality of terms. The sixth determining sub-module is used to determine a semantic similarity between the first semantic information of the query to be retrieved and the second semantic information of each target query in the retrieving result. The first sorting sub-module is used to perform sorting on the retrieving result based on each term index, a weight corresponding to each term index, the semantic similarity, and a weight corresponding to the semantic similarity.

According to the embodiments of the present disclosure, the fifth determining sub-module includes a first determining unit, a second determining unit, a third determining unit, and a fourth determining unit. The first determining unit is used to determine a position similarity between a first position information of the plurality of terms in the query to be retrieved and a second position information of the plurality of terms in the target query based on the first position information and the second position information. The second determining unit is used to determine a first proportion of the plurality of terms in the query to be retrieved. The third determining unit is used to determine a second proportion of the plurality of terms in the target query. The fourth determining unit is used to determine the position similarity, the first proportion, and the second proportion as the at least one term index.

According to the embodiments of the present disclosure, the apparatus 600 may further include: a second sorting module, used to perform sorting on the retrieving result to recommend a sorted retrieving result. The second sorting module includes: a seventh determining sub-module and a second sorting sub-module. The seventh determining sub-module is used to determine an answer corresponding to each target query in the retrieving result. The second sorting sub-module is used to perform sorting on the retrieving result based on a quality information of the answer and a feedback information of the answer.

According to the embodiments of the present disclosure, the quality information includes at least one of: whether the answer is missing or not or whether a format of the answer is a picture format or not; and the feedback information includes at least one of: an evaluation information of a user on the answer or a behavior information of a user on the answer.

According to the embodiments of the present disclosure, the at least one candidate query is divided into a plurality of groups; and the comparing module 620 includes an eighth determining sub-module and a comparing sub-module. The eighth determining sub-module is used to determine a target group from the plurality of groups, a query type of a candidate query in the target group is matched with a query type of the query to be retrieved. The comparing sub-module is used to compare the first processing result with a second processing result of the candidate query in the target group.

In the technical solution of the present disclosure, the collection, storage, use, processing, transmission, provision, disclosure and application of the user's personal information involved are all in compliance with the provisions of relevant laws and regulations, and necessary confidentiality measures have been taken, and it does not violate public order and good morals. In the technical solution of the present disclosure, before obtaining or collecting the user's personal information, the user's authorization or consent is obtained.

According to the embodiments of the present disclosure, the present disclosure further provides an electronic device, a readable storage medium, and a computer program product.

Figure 7:
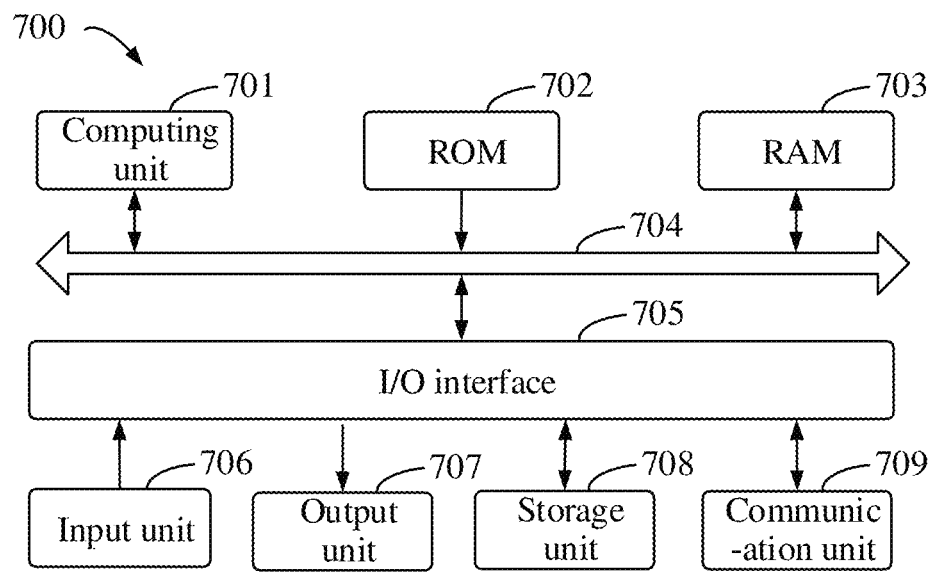
FIG. 7 shows a block diagram of an electronic device for implementing retrieving a query according to the embodiments of the present disclosure.

FIG. 7 shows a schematic block diagram of an exemplary electronic device 700 for implementing the embodiments of the present disclosure. The electronic device 700 is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the device 700 may include a computing unit 701, which may perform various appropriate actions and processing based on a computer program stored in a read-only memory (ROM) 702 or a computer program loaded from a storage unit 708 into a random access memory (RAM) 703. Various programs and data required for the operation of the electronic device 700 may be stored in the RAM 703. The computing unit 701, the ROM 702 and the RAM 703 are connected to each other through a bus 704. An input/output (I/O) interface 705 is further connected to the bus 704.

Various components in the device 700, including an input unit 706 such as a keyboard, a mouse, etc., an output unit 707 such as various types of displays, speakers, etc., a storage unit 708 such as a magnetic disk, an optical disk, etc., and a communication unit 709 such as a network card, a modem, a wireless communication transceiver, etc., are connected to the I/O interface 705. The communication unit 709 allows the electronic device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 701 may perform the various methods and processes described above, such as the method of retrieving a query. For example, in some embodiments, the method of retrieving a query may be implemented as a computer software program that is tangibly contained on a machine-readable medium, such as a storage unit 708. In some embodiments, part or all of a computer program may be loaded and/or installed on the electronic device 700 via the ROM 702 and/or the communication unit 709. When the computer program is loaded into the RAM 703 and executed by the computing unit 701, one or more steps of the method of retrieving a query described above may be performed. Alternatively, in other embodiments, the computing unit 701 may be configured to perform the method of retrieving a query in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A computer-implemented method of retrieving a query by a server, comprising:
processing a query to be retrieved from a client, so as to obtain a first processing result for the query to be retrieved, the first processing result containing a first text information and a first semantic information;
comparing the first processing result with a second processing result of each of at least one candidate query, so as to obtain a comparison result, the second processing result containing a second text information and a second semantic information;
determining a target query from the at least one candidate query based on the comparison result;
determining at least one of the target query or an answer corresponding to the target query as a retrieving result, and sending the retrieving result to the client; and
performing sorting on the retrieving result to recommend a sorted retrieving result; wherein
the performing sorting on the retrieving result includes:
determining a plurality of terms for each target query in the retrieving result, wherein at least one of the plurality of terms belongs to the query to be retrieved and the target query;
determining at least one term index based on the plurality of terms;
determining a semantic similarity between the first semantic information of the query to be retrieved and the second semantic information of each target query in the retrieving result, wherein the first semantic information is represented as a first vector, and the second semantic information is represented as a second vector, and the smaller a vector distance between the first vector and the second vector, the more similar the query to be retrieved is to the target query; and
performing sorting on the retrieving result based on each term index, a weight corresponding to the each term index, the semantic similarity, and a weight corresponding to the semantic similarity.

2. The method of claim 1, wherein the comparison result comprises a first comparison sub-result and a second comparison sub-result, the first comparison sub-result is obtained based on the first text information and the second text information, and the second comparison sub-result is obtained based on the first semantic information and the second semantic information;
wherein the determining a target query from the at least one candidate query based on the comparison result comprises:
determining a first candidate query from the at least one candidate query based on the first comparison sub-result;
determining a second candidate query from the at least one candidate query based on the second comparison sub-result; and
determining an intersection of the first candidate query and the second candidate query as the target query.

3. The method of claim 1, wherein the determining at least one term index based on the plurality of terms comprises:
determining a position similarity between a first position information of the plurality of terms in the query to be retrieved and a second position information of the plurality of terms in the target query, based on the first position information and the second position information;
determining a first proportion of the plurality of terms in the query to be retrieved;
determining a second proportion of the plurality of terms in the target query; and
determining the position similarity, the first proportion, and the second proportion as the at least one term index.

4. The method of claim 1, wherein the performing sorting on the retrieving result further includes:
determining an answer corresponding to each target query in the retrieving result; and
performing sorting on the retrieving result based on a quality information of the answer and a feedback information of the answer.

5. The method of claim 4, wherein:
the quality information comprises at least one of: whether the answer is missing or not or whether a format of the answer is a picture format or not; and
the feedback information comprises at least one of: an evaluation information of a user on the answer or a behavior information of a user on the answer.

6. The method of claim 1, wherein the at least one candidate query is divided into a plurality of groups; the comparing the first processing result with a second processing result of each of at least one candidate query comprises:
determining a target group from the plurality of groups, wherein a query type of a candidate query in the target group is matched with a query type of the query to be retrieved; and
comparing the first processing result with the second processing result of the candidate query in the target group.

7. The method of claim 2, wherein the at least one candidate query is divided into a plurality of groups; the comparing the first processing result with a second processing result of each of at least one candidate query comprises:
determining a target group from the plurality of groups, wherein a query type of a candidate query in the target group is matched with a query type of the query to be retrieved; and
comparing the first processing result with the second processing result of the candidate query in the target group.

8. The method of claim 3, wherein the at least one candidate query is divided into a plurality of groups; the comparing the first processing result with a second processing result of each of at least one candidate query comprises:
determining a target group from the plurality of groups, wherein a query type of a candidate query in the target group is matched with a query type of the query to be retrieved; and
comparing the first processing result with the second processing result of the candidate query in the target group.

9. The method of claim 4, wherein the at least one candidate query is divided into a plurality of groups; the comparing the first processing result with a second processing result of each of at least one candidate query comprises:
determining a target group from the plurality of groups, wherein a query type of a candidate query in the target group is matched with a query type of the query to be retrieved; and comparing the first processing result with the second processing result of the candidate query in the target group.

10. The method of claim 5, wherein the at least one candidate query is divided into a plurality of groups; the comparing the first processing result with a second processing result of each of at least one candidate query comprises:
   determining a target group from the plurality of groups, wherein a query type of a candidate query in the target group is matched with a query type of the query to be retrieved; and
   comparing the first processing result with the second processing result of the candidate query in the target group.

11. An electronic device, comprising:
   at least one processor; and
   a memory communicatively connected to the at least one processor, wherein the memory stores instructions executable by the at least one processor, and the instructions, when executed by the at least one processor, cause the at least one processor to:
   process a query to be retrieved from a client, so as to obtain a first processing result for the query to be retrieved, wherein the first processing result contains a first text information and a first semantic information;
   compare the first processing result with a second processing result of each of at least one candidate query, so as to obtain a comparison result, wherein the second processing result contains a second text information and a second semantic information;
   determine a target query from the at least one candidate query based on the comparison result;
   determine at least one of the target query or an answer corresponding to the target query as a retrieving result, and send the retrieving result to the client; and
   perform sorting on the retrieving result to recommend a sorted retrieving result, wherein
   performing sorting on the retrieving result includes:
      determining a plurality of terms for each target query in the retrieving result, wherein at least one of the plurality of terms belongs to the query to be retrieved and the target query;
      determining at least one term index based on the plurality of terms;
      determining a semantic similarity between the first semantic information of the query to be retrieved and the second semantic information of each target query in the retrieving result, wherein the first semantic information is represented as a first vector, and the second semantic information is represented as a second vector, and the smaller a vector distance between the first vector and the second vector, the more similar the query to be retrieved is to the target query; and
      performing sorting on the retrieving result based on each term index, a weight corresponding to the each term index, the semantic similarity, and a weight corresponding to the semantic similarity.

12. The electronic device according to claim 11, wherein the at least one processor is further configured to:
   in a case that the comparison result comprises a first comparison sub-result and a second comparison sub-result, the first comparison sub-result is obtained based on the first text information and the second text information, and the second comparison sub-result is obtained based on the first semantic information and the second semantic information,
   determine a first candidate query from the at least one candidate query based on the first comparison sub-result;
   determine a second candidate query from the at least one candidate query based on the second comparison sub-result; and
   determine an intersection of the first candidate query and the second candidate query as the target query.

13. A non-transitory computer-readable storage medium having computer instructions stored thereon, wherein the computer instructions are configured to cause a computer to:
   process a query to be retrieved from a client, so as to obtain a first processing result for the query to be retrieved, wherein the first processing result contains a first text information and a first semantic information;
   compare the first processing result with a second processing result of each of at least one candidate query, so as to obtain a comparison result, wherein the second processing result contains a second text information and a second semantic information;
   determine a target query from the at least one candidate query based on the comparison result;
   determine at least one of the target query or an answer corresponding to the target query as a retrieving result, and send the retrieving result to the client; and
   perform sorting on the retrieving result to recommend a sorted retrieving result, wherein
   performing sorting on the retrieving result includes:
      determining a plurality of terms for each target query in the retrieving result, wherein at least one of the plurality of terms belongs to the query to be retrieved and the target query;
      determining at least one term index based on the plurality of terms;
      determining a semantic similarity between the first semantic information of the query to be retrieved and the second semantic information of each target query in the retrieving result, wherein the first semantic information is represented as a first vector, and the second semantic information is represented as a second vector, and the smaller a vector distance between the first vector and the second vector, the more similar the query to be retrieved is to the target query; and
      performing sorting on the retrieving result based on each term index, a weight corresponding to the each term index, the semantic similarity, and a weight corresponding to the semantic similarity.

* * * * *